Sept. 19, 1967 W. H. JACOBS 3,342,384
DISPENSING VALVE

Filed April 30, 1965 2 Sheets-Sheet 1

INVENTOR
WILLIAM H. JACOBS
BY,

*Wolf, Greenfield & Hicken*

ATTORNEYS

INVENTOR
WILLIAM H. JACOBS
BY,
Wolf, Greenfield + Hicken
ATTORNEYS

United States Patent Office 3,342,384
Patented Sept. 19, 1967

3,342,384
DISPENSING VALVE
William H. Jacobs, Brookline, Mass., assignor to Jet Spray Cooler, Inc., Waltham, Mass., a corporation of Massachusetts
Filed Apr. 30, 1965, Ser. No. 452,118
2 Claims. (Cl. 222—481)

This invention relates to beverage dispensers and more particularly comprises a new and improved dispensing valve for use in such devices.

Counter top beverage dispensers having refrigerated beverage tanks normally employ manually operated mechanical valves for drawing off beverage from the tanks. Manually operated mechanical valves have been used since the advent of such dispensers, and the industry has sought ways of improving them such as by reducing the number of pieces which make up the valve assemblies, providing valves which may most easily be cleaned, making them easier to assemble and disassemble, improving their sealing effectiveness and making them more attractive. Advances have been made in all these directions, but all mechanical valves lack one or more features which limit their effectiveness. Because they are manually operated and mechanical in nature, it is difficult and sometimes impractical to devise a control device which will give automatic portion control. Further, the mechanical valves necessarily have several moving parts and by their nature are somewhat complex structurally and require some skill to assemble and disassemble. The ability to clean, assemble and disassemble the valves is a particularly important consideration as it is essential that they regularly be detached and cleaned so as to maintain the standards of cleanliness required.

One important object of this invention is to provide an electrically operated valve for beverage dispensers.

Another important object of this invention is to provide an electrically operated dispensing valve which has a minimum number of moving parts so that the valve may be disassembled, cleaned and reassembled with minimum difficulty.

Yet another important object of this invention is to provide a valve for beverage dispensers which is free of all external hardware so that the valve has an attractive profile for purposes of design.

To accomplish these and other objects, the beverage dispenser of this invention includes a bowl having a discharge spout provided therein, within which is movable a one-piece valve member. The valve member carries a sealing gasket that rests upon the bottom of the bowl about the top of the spout when the valve is closed to seal the discharge spout. An opening in the valve communicates with the interior of the bowl for discharging the contents thereof when the valve member is in a raised or open position. The valve member is moved by a coil wound about the spout on the outside of the bowl.

These and other objects and features of this invention along with its incident advantages will be better understood and appreciated from the following detailed description of one embodiment thereof, selected for purposes of illustration and shown in the accompanying drawing in which.

Figure 1:
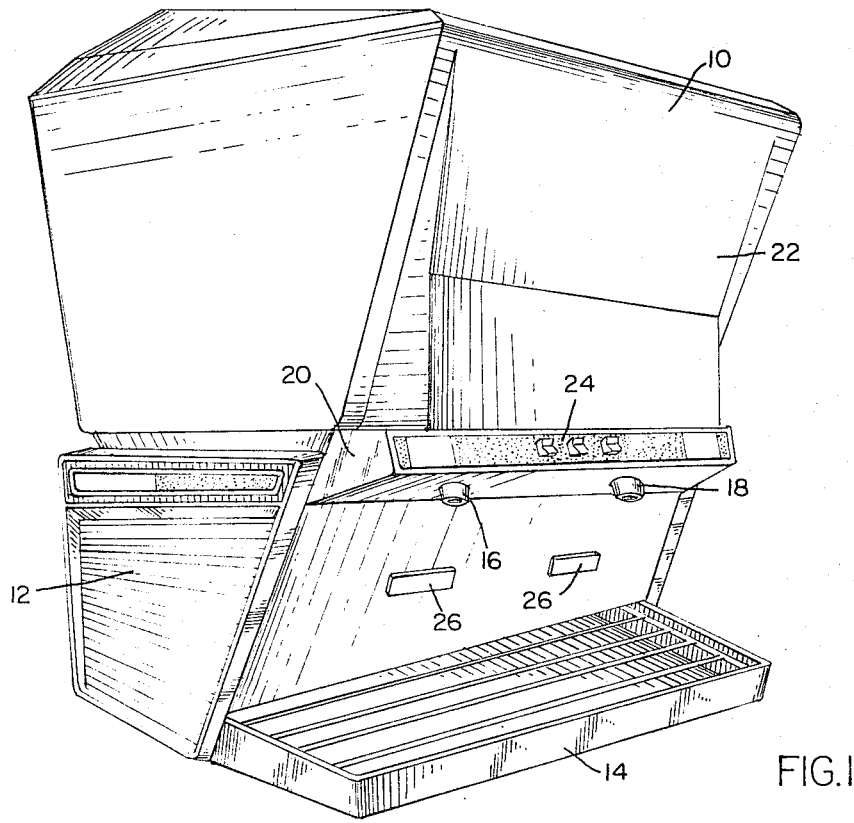
FIG. 1 is a perspective view of a beverage dispenser having a dispensing valve assembly constructed in accordance with this invention.

The beverage dispenser shown in FIG. 1 includes a tank or bowl 10 supported on a stand 12, which stand has a tray 14 extending from its bottom on the front thereof below the discharge spouts 16 and 18 that form part of the bowl 10. The spouts 16 and 18 extend through plate 59 of panel 20 immediately below the front wall 22 of the bowl, which panel carries several control buttons 24. Immediately above the tray 14 are a pair of push-button type switches 26 which are connected in the circuit that controls the opening and closing of the valves within the spouts 16 and 18. The valve assemblies oriented in and about the spouts 16 and 18 are identical, and one is shown in detail in FIGS. 2 and 3.

Figure 2:
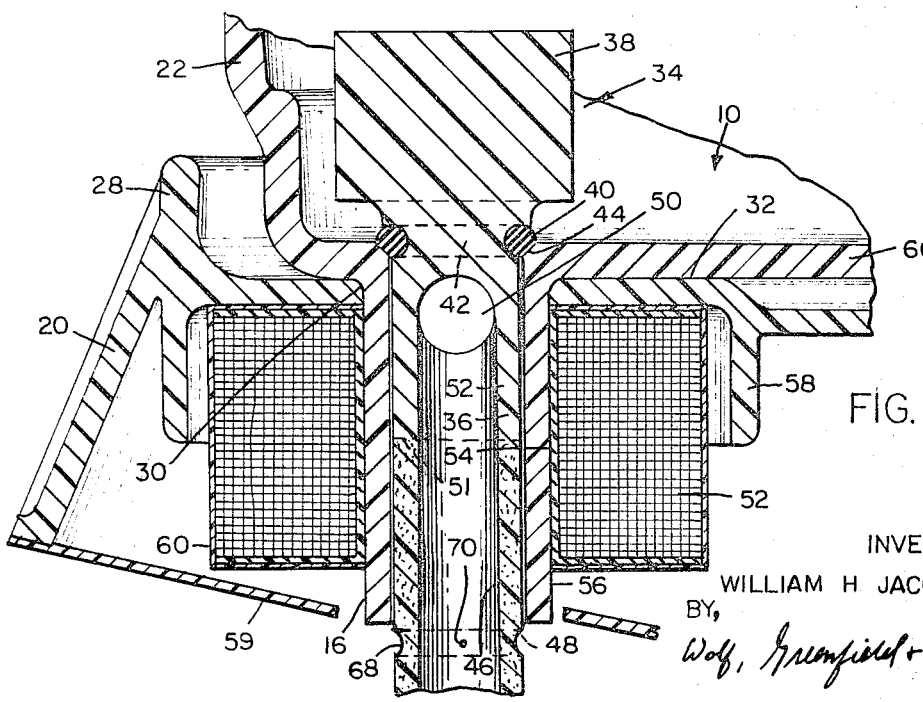
FIG. 2 is an enlarged fragmentary cross-sectional view of the valve assembled used in the dispenser of FIG. 1 and showing the assembly in a closed condition.
Figure 3:
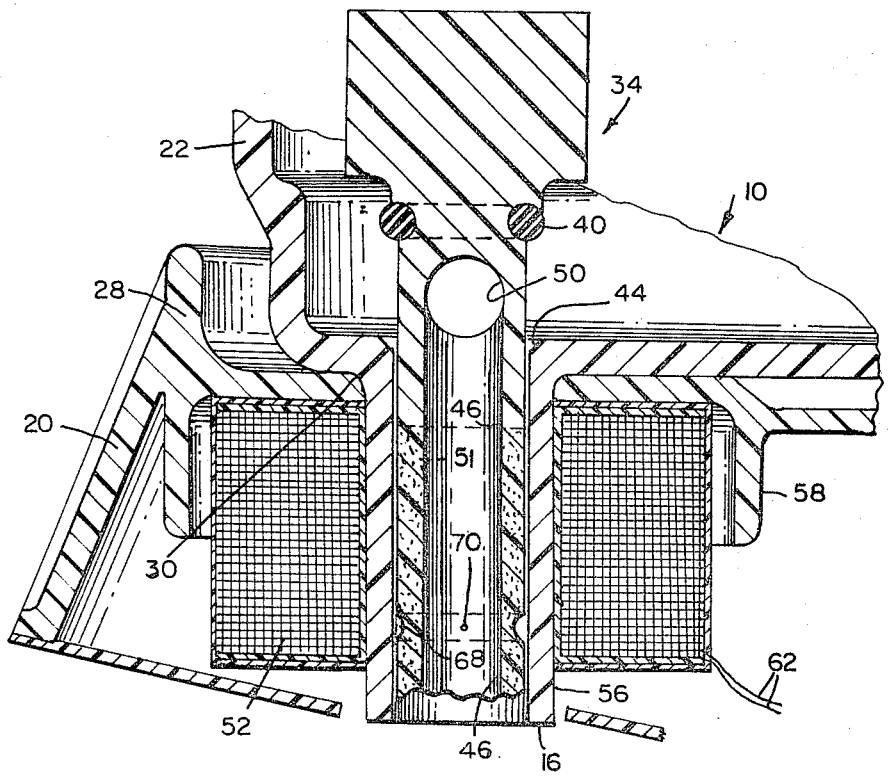
FIG. 3 is a cross-sectional view similar to that of FIG. 2 and showing the valve assembly in its open condition.

In FIGS. 2 and 3 the bowl 10 is shown seated on a tray 28 that rests on top of the stand 12. The tray 28 may be made of metal, plastic, or any other suitable material and is shown to include an opening 30 therein through which the spout 16 formed as an integral part of the bowl 10 extends. Thus, in FIG. 2 the bowl 10 is shown seated on the upper surface 32 of the tray 28, and the spout 16 extends through the opening 30. The panel 20 forms part of the tray 28 and covers a major portion of the spout 16 so that just the lower end of the spout is exposed, as shown in FIG. 1. The bowl 10 like the tray 28 is shown to be made of a plastic material, and preferably is made of a very tough plastic such as a formaldehyde type resin.

Disposed within the bowl 10 and extending into the spout 16 is a valve member 34 composed of a cylindrical stem 36 within the spout 16 and a weight 38 at its top within the bowl proper. The member 34 carries a gasket 40 just below the weight 38 in an annular groove 42, and the gasket 40 cooperates with a valve seat 44 at the top of the spout 16 in the bowl to seal the spout closed when the member 34 is in the position shown in FIG. 2. The member 34 is movable from that position to the raised position shown in FIG. 3 as will be described below.

The stem 36 of the valve member 34 includes a central passage 46 that extends from its bottom edge 48 upwardly to a point beneath the gasket 40, and the passage 46 is in communication with a radial duct 50 that extends through the cylindrical wall 52 of the stem. When the member 34 is raised from the position shown in FIG. 2 to that shown in FIG. 3 with the duct 50 at least in part above the bottom of the bowl, the beverage in the bowl can flow into the duct 50 and down the passage 46 to discharge from the bowl. When the valve member 34 returns to the position shown in FIG. 2, the gasket 40 forms a seal about the spout, and the beverage is not able to flow through the spout in the duct 50 so as to discharge from the dispenser.

The weight 38 and a portion of the stem 36 adjacent the weight are made of a nonmagnetic material while the lower portion of the stem 36 below the duct 50 is made of a magnetic material. The magnetic portion below the broken line 51 of the valve member 34 cooperates with coil 52 disposed about the spout 16 to open the valve.

A bobbin 54 is secured to the outer surface 56 of the spout 16, and the coil 52 is wound about the bobbin. The coil lies within the skirt 58 extending downwardly from and forming part of the tray 28 and above the cover plate 59. The bobbin 54 which is U-shaped in cross section defines an annular channel about the spout 16 and cooperates with a surrounding cap 60 to form a housing for the coil. In FIG. 3 a pair of leads 62 are shown to extend from the coil through the cap, and the leads are connected to a power source and a switch 26 to energize and deenergize the coil.

In operation the valve functions as follows. In the "off" or closed position shown in FIG. 2, the coil 52 is deenergized and the weight 38 forming part of the valve member 34 serves to settle the valve member in the position shown in FIG. 2. The gasket in that position rests on the valve seat 44, and no flow can occur from the bowl 10 through the spout 16. When the coil 52 is energized by actuation of the switch 26, the field established by the coil 52 overcomes the weight 38 and lifts the valve member 34 through action upon the portion of the stem 46 made of magnetic material. The member 34 is raised a distance sufficient to expose at least part of the duct 50 above the lower wall 66 of the bowl. When the member 34 lifts the gasket 40 is unseated, and the beverage is allowed to flow into the duct 50 and down the passage 46 to discharge from the spout 16 into a container (not shown) placed on the drip tray 14.

When the condition of switch 26 is again changed, coil 52 deenergizes and the valve member 34 is left to the influence of the weight 38 which causes the valve member to reseat itself in the position shown in FIG. 2. To prevent drip after the valve is closed, caused by beverage in the passage 46, a collecting ring 68 is provided in the outer surface of the stem 56, which ring is in communication with the passage 46 through a number of ports 70, one of which is shown in FIG. 2. The collecting ring 68 and the ports 70 allow air to enter the passage 46 from about the stem so as to break the vacuum in the liquid column within the passage 46 and thereby allow that column to discharge.

From the foregoing description it will be apparent that the valve shown may be duplicated any number of times in a beverage dispenser having a tank with more than one compartment. For example, in the dispenser shown in FIG. 1, two such valve assemblies are provided, one for the spout 16 and the other for the spout 18 as shown for tank 10 has two separate compartments. It will also be appreciated that the many objects set forth in the introduction are achieved by this device. For cleaning, it is necessary only to remove the single valve member 34, for only that member in the entire valve assembly is in contact with the beverage. Once cleaned, it may be readily dropped in place with the stem 36 in the spout. It will be noted that the duct 50 is disposed immediately below the gasket 40 so that the valve 34 need only be elevated a very short distance to expose the port 50 above the bottom wall 66 of the bowl. The valve member 34 itself, although made of two materials, namely, a weight and part of stem 36 of a nonmagnetic material and the lower portion of the stem of a magnetic material, is effectively a single part, as the two portions are welded or otherwise permanently secured together so that they become and remain one after the member is formed. Therefore, there is only one removable part, and there is little chance of it becoming lost or misplaced. The coil 52 is in an accessible position about the spout 16 so that it may be removed and serviced as required merely by removing plate 59 and without disturbing the remaining portion of the assembly. There is little or no opportunity for the gasket 40 to seat improperly on the valve seat because the stem 36 serves as a guide within the spout to maintain the parts in alignment. The member 34 cannot wobble or otherwise become misaligned with the spout and seat.

Those skilled in the art will appreciate that numerous modifications may be made of this invention without departing from its spirit. Therefore, it is not intended to limit the breadth of this invention to the single embodiment illustrated and described. Rather, it is intended that the scope of this invention be determined by the appended claims and their equivalents.

What is claimed is:
1. In a beverage dispenser,
   a bowl having a vertically oriented cylindrical discharge spout extending downwardly from its bottom,
   a magnetic coil mounted about the discharge spout,
   a valve body having a cylindrical stem made of a magnetic material disposed within the spout and a weight made of a nonmagnetic material disposed above the stem within the bowl,
   said body being raised in response to energization of the coil,
   a sealing gasket disposed about the stem and resting on the bottom of the bowl to seal the spout closed when the stem is in its lower position assumed when the coil is deenergized,
   and a passage through the stem with an opening thereto in the stem below the gasket which opening is exposed above the bottom of the bowl when the coil is energized.
2. In a beverage dispenser as defined in claim 1,
   said passage through the stem extending axially therethrough from the opening to the bottom of the stem,
   a peripheral groove formed in the outer surface substantially at the lower end of the movable valve stem,
   and a vent hole through the stem from the groove to the passage for venting a column of liquid in the passage to allow it to pass out of the passage when the stem moves to the lower position from the upper position.

References Cited

UNITED STATES PATENTS

| 2,254,833 | 9/1941 | Ashkenaz | 222—504 X |
| 2,710,707 | 6/1955 | Persak | 222—108 |
| 2,887,255 | 5/1959 | Bauerlein | 222—504 X |

FOREIGN PATENTS

| 922,433 | 4/1963 | Great Britain. |

ROBERT B. REEVES, *Primary Examiner.*

ROBERT B. REEVES, *Examiner.*

F. R. HANDREN, *Assistant Examiner.*